US007673801B2

(12) United States Patent
Park et al.

(10) Patent No.: US 7,673,801 B2
(45) Date of Patent: Mar. 9, 2010

(54) APPARATUS AND METHOD FOR CONTROLLING MICROWAVE OVEN USING BAR CODE

(75) Inventors: Guen Yong Park, Suwon-Si (KR); Kwang Keun Kim, Yongin-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 329 days.

(21) Appl. No.: 11/362,919

(22) Filed: Feb. 28, 2006

(65) Prior Publication Data

US 2006/0278710 A1 Dec. 14, 2006

(30) Foreign Application Priority Data

Jun. 10, 2005 (KR) ...................... 10-2005-0049749

(51) Int. Cl.
*G06K 15/00* (2006.01)
*H05B 6/64* (2006.01)

(52) U.S. Cl. ............................ 235/462.13; 235/462.14; 235/462.42; 219/679; 219/702

(58) Field of Classification Search ............ 235/462.13, 235/462.14, 462.42, 462.43; 219/679, 705
See application file for complete search history.

(56) References Cited

U.S. PATENT DOCUMENTS

| | | | | |
|---|---|---|---|---|
| 5,291,009 | A * | 3/1994 | Roustaei | 235/462.42 |
| 5,532,467 | A * | 7/1996 | Roustaei | 235/462.42 |
| 7,096,221 | B2 * | 8/2006 | Nakano | 707/10 |
| 7,119,820 | B2 * | 10/2006 | Montgomery | 347/116 |
| 2003/0075538 | A1 | 4/2003 | Kish et al. | |

FOREIGN PATENT DOCUMENTS

| | | |
|---|---|---|
| GB | 2 359 402 | 8/2001 |
| KR | 2002-0081382 | 10/2002 |
| WO | WO 2005-050390 | 6/2005 |

OTHER PUBLICATIONS

Extended European Search Report issued by the European Patent Office on Jun. 28, 2006 in Application No. 06004379.1—2214 including an Abstract (10 pages).
Communication issued by the European Patent Office on Jun. 14, 2007 concerning deficiencies in Application No. 06004379.1—2206 (1 page).

* cited by examiner

*Primary Examiner*—Jamara A Franklin

(57) ABSTRACT

An apparatus and method for controlling a microwave oven using a bar code. The apparatus includes an operating panel provided on the front surface of the microwave oven, a bar code scanner installed in the operating panel and projecting light to the bar code attached to a package of food to obtain data of the bar code, and a main controller for controlling a cooking operation for cooking the food according to the data of the bar code obtained by the bar code scanner. The apparatus simply and rapidly performs the cooking of food using the bar code, increases the bar code recognition distance thereof, and is easily and economically operated.

10 Claims, 9 Drawing Sheets

APPARATUS AND METHOD FOR CONTROLLING MICROWAVE OVEN USING BAR CODE

CROSS-REFERENCE TO RELATED APPLICATIONS

This application claims the benefit of Korean Patent Application No. 10-2005-49749, filed Jun. 10, 2005, in the Korean Intellectual Property Office, the disclosure of which is incorporated herein by reference.

BACKGROUND OF THE INVENTION

1. Field of the Invention

The present invention relates to an apparatus and method for controlling a microwave oven using a bar code. More particularly, to an apparatus and method for controlling a microwave oven using a bar code, in which data regarding food are obtained by reading the bar code attached to a package of the food.

2. Description of the Related Art

Recently, a cooking apparatus, which cooks foods using data obtained through a bar code scanner, has been developed.

In the conventional cooking apparatus, the bar code scanner is connected to a main body by an electric wire so that a user can move the bar code scanner via a handle grip attached thereto, and approaches a package of food, thereby reading a bar code printed on the package of the food.

The above operation causes inconvenience to the user. Further, since the conventional cooking apparatus requires a structure for taking the bar code scanner out of the apparatus, the size of the cooking apparatus is increased. Moreover, in the case that the bar code is scanned by the bar code scanner under the condition that the food is distant from the bar code, the bar code scanner cannot precisely recognize the bar code and the scanning operation must be repeated several times.

SUMMARY OF THE INVENTION

Accordingly, it is an aspect of the present invention is to provide an apparatus and method for controlling a microwave oven using a bar code, in which a bar code scanner is provided on an operating panel of the microwave oven so as to conveniently scan the bar code attached to a package of food, and the recognition distance of the bar code scanner for recognizing the bar code is expanded.

Additional aspects and/or advantages of the invention will be set forth in part in the description which follows and, in part, will be apparent from the description, or may be learned by practice of the invention.

The foregoing and/or aspects of the present invention are achieved by providing an apparatus for controlling a microwave oven using a bar code including an operating panel provided on the front surface of the microwave oven, a bar code scanner installed in the operating panel, and projecting light to the bar code attached to a package of food to obtain data of the bar code, and a main controller to control a cooking operation for cooking the food according to the data of the bar code obtained by the bar code scanner.

The bar code scanner includes at least two kinds of lamps having different angles of projection of light to scan the bar code.

The bar code scanner further includes a window, through which the light radiated from the lamps passes, and a substrate, on which the lamps are installed.

The bar code scanner further includes a camera to capture an image of the bar code, and a scanner controller to decode the image of the bar code.

The bar code scanner includes a first group including at least a first lamp having a first angle of projection and a second group including at least a second lamp having a second angle of projection, which is smaller than the first angle of projection, and the first lamp of the first group and the second lamp of the second group are connected in series such that the first lamp and second lamp are alternately arranged.

The first and second lamps are infrared lamps.

The first angle of projection of the first lamp is 120°, and the second angle of projection of the second lamp is 50°.

The scanner controller performs the scanning of the bar code or stop the scanning of the bar code according to control instructions of the main controller.

The apparatus further includes a counter to measure the scanning stop time in which the scanning operation for obtaining the data of the bar code is stopped, wherein the main controller stops the scanning operation when the scanning stop time during the scanning operation elapses a designated time.

It is another aspect of the present invention to provide a method for controlling a microwave oven to cook food using a bar code, the method including receiving scanning start instructions, operating at least a first lamp and at least a second lamp having different angles of projection according to the scanning start instructions so that light is projected from the lamps to the bar code attached to a package of the food, obtaining data of the bar code by receiving an image of the bar code, and performing a cooking operation for cooking the food according to the obtained data of the bar code.

The obtaining of the data of the bar code includes decoding the obtained image of the bar code, and recognizing data of the bar code corresponding to the cooking operation by comparing the decoded data of the image of the bar code to predetermined data.

When the scanning operation for obtaining the data of the bar code is stopped, the scanning stop time is measured, and the lamps are turned off when the measured scanning stop time elapses a designated time.

The first angle of projection of the first lamp is larger than the second angle of projection of the second lamp, and the first and second lamps are infrared lamps.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF THE PREFERRED EMBODIMENTS

Figure 1:
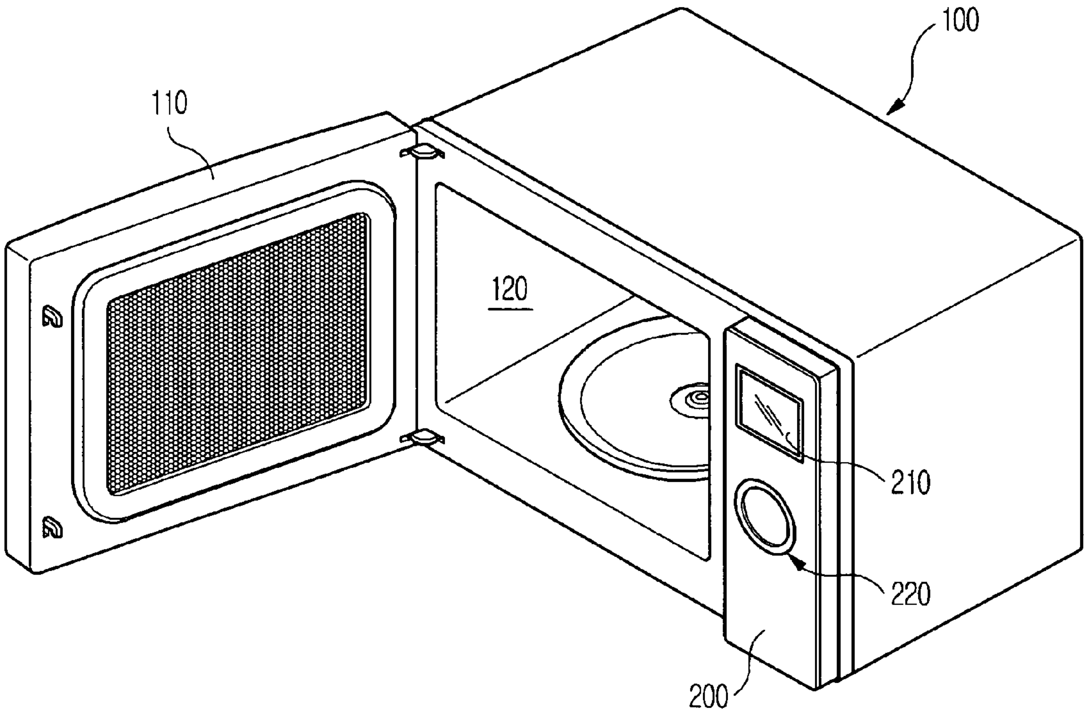
FIG. 1 is a perspective view illustrating a microwave oven according to an embodiment of the present invention.

Reference will now be made in detail to the embodiment of the present invention, an example of which is illustrated in the accompanying drawings, wherein like reference numerals refer to like elements throughout. The embodiment is described below to explain the present invention by referring to the figures.

Figure 2:
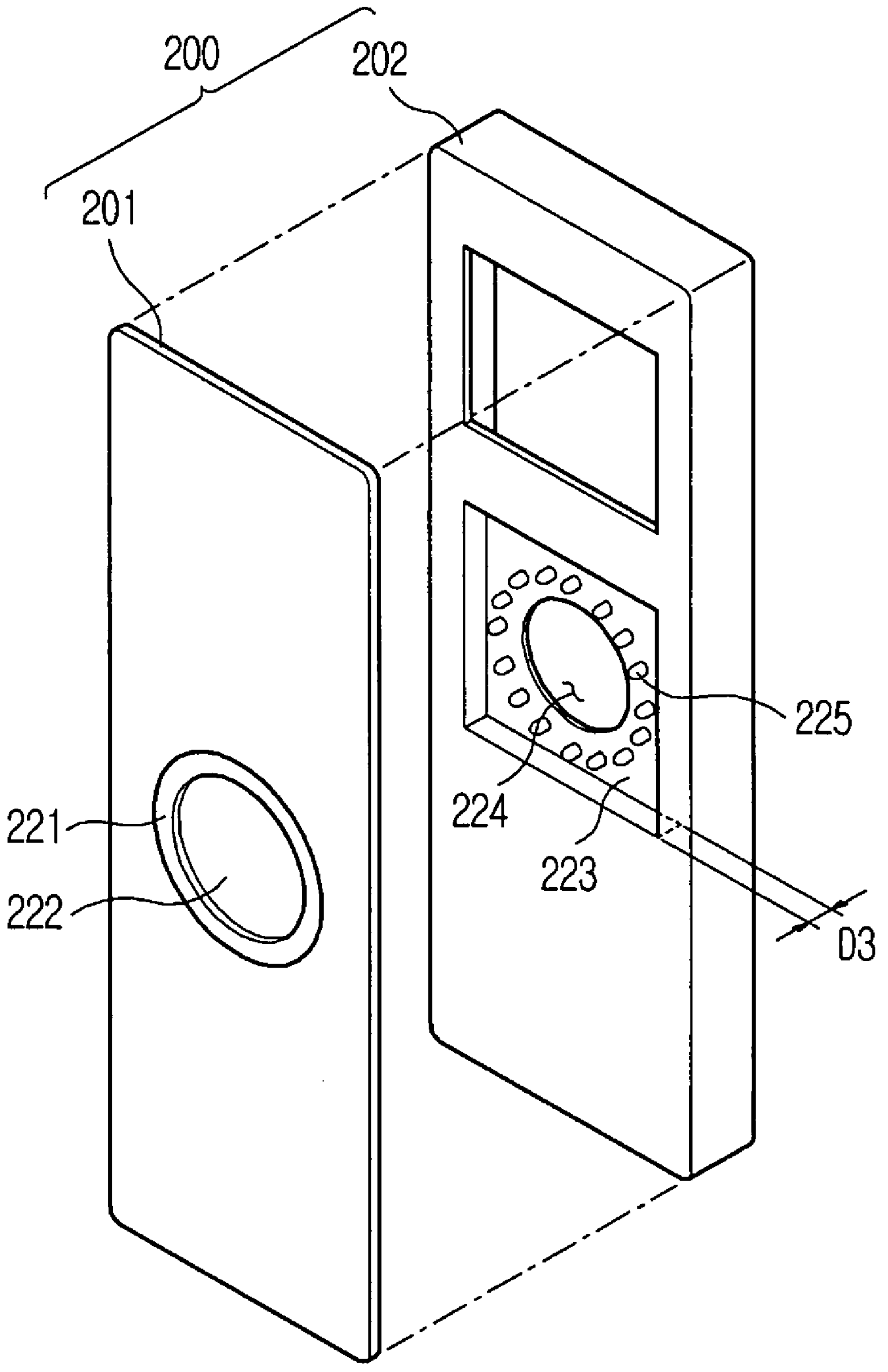
FIG. 2 is an exploded perspective view of a bar code scanner installed on an operating panel of the microwave oven of FIG. 1.

In FIGS. 1 and 2, a microwave oven in accordance with an embodiment of the present invention comprises a main body 100 forming the external appearance of the microwave oven and provided with a cooking chamber 120 installed therein, and a door 110 and an operating panel 200 installed on the front surface of the main body 100.

The operating panel 200 comprises a display unit 210 to display operating data and an operating state to perform a cooking operation, and a bar code scanner 220 to scan a bar code attached to a package of food.

The operating panel 200 further comprises an outer case 201 and an inner case 202.

The bar code scanner 220 comprises a window 222 fixed to the outer case 201 by a holder 221, a substrate 223 disposed in the rear of the window 222 and provided with a hole 224 formed through the central area thereof, and a plurality of infrared lamps 225 disposed in a circular shape on the substrate 223 for projecting infrared light through the window 222. A camera, which will be described later, is located in the rear of the hole 224. The camera serves to receive the image of the bar code reflected by the light. The substrate 223 is fixed to the inner case 202, and is separated from the outer case 201 by a designated distance (D3) when the inner case 202 and the outer case 201 are connected together.

Figure 3A:
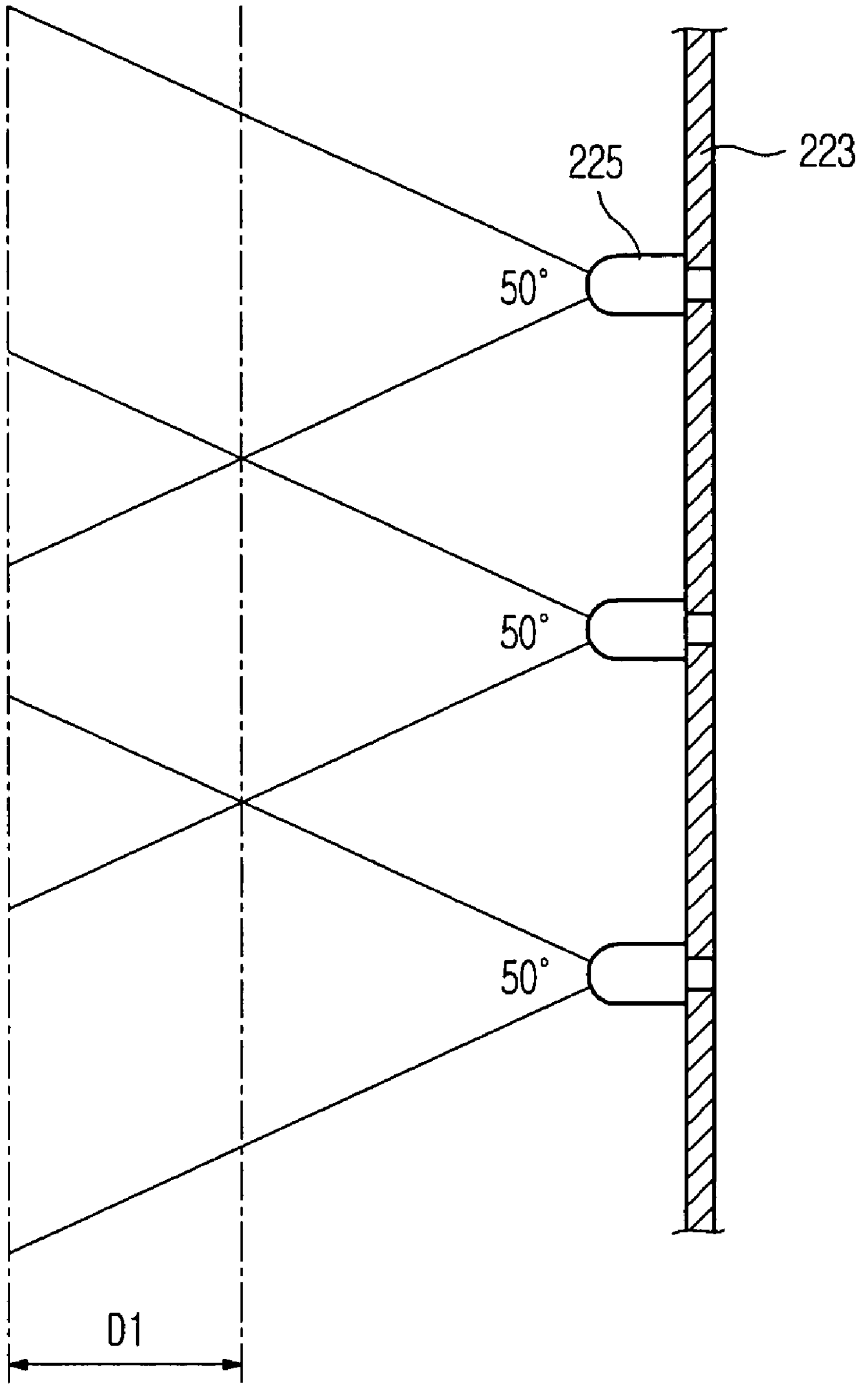
FIG. 3A is a view illustrating the recognition distance of a bar code scanner of the present invention when infrared lamps of the bar code scanner have the same angle of projection.
Figure 3B:
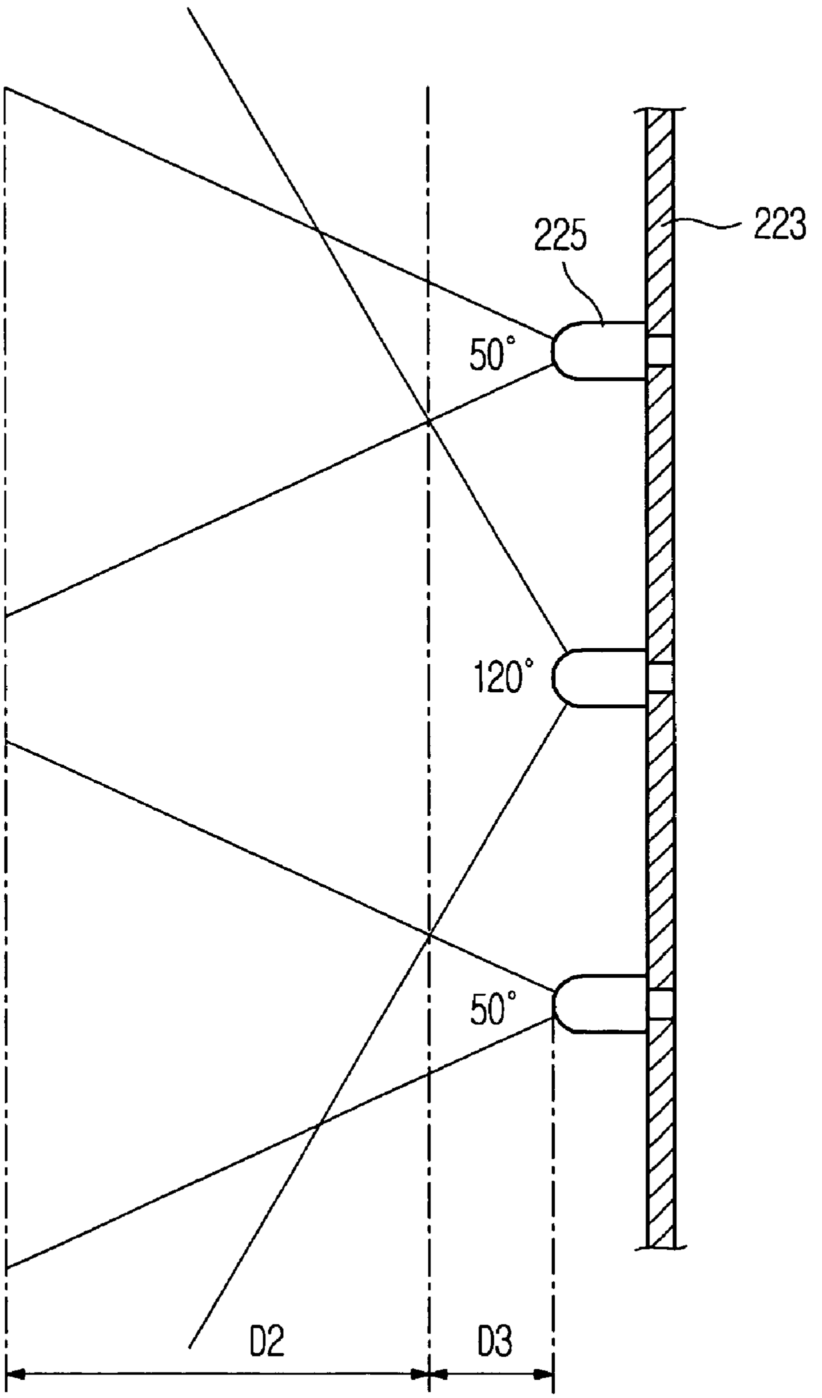
FIG. 3B is a view illustrating the recognition distance of the bar code scanner of an embodiment of the present invention when the infrared lamps of the bar code scanner have different angles of projection.

In the case that the angles of the projection of the plural infrared lamps 225 are the same, as shown in FIG. 3A, the bar code scanner 220 includes a limited recognition distance (D1) for recognizing the bar code. When the bar code is excessively close to the infrared lamps 225, the bar code is deviated from the recognition distance (D1) and cannot be precisely recognized by the bar code scanner 220. As shown in FIG. 3B, the infrared lamps 225 having a wide angle of projection and the infrared lamps 225 having a narrow angle of projection are alternately arranged so that the bar code scanner 220 has an increased recognition distance (D2). Since the infrared lamps 225 are separated from the outer case 201 by a designated distance (D3), the recognition distance (D2) of the bar code scanner 220 is calculated from the front surface of the window 222, and, when food approaches the window 222, the bar code scanner 220 can precisely recognize a bar code attached to a package of the food.

Figure 4A:
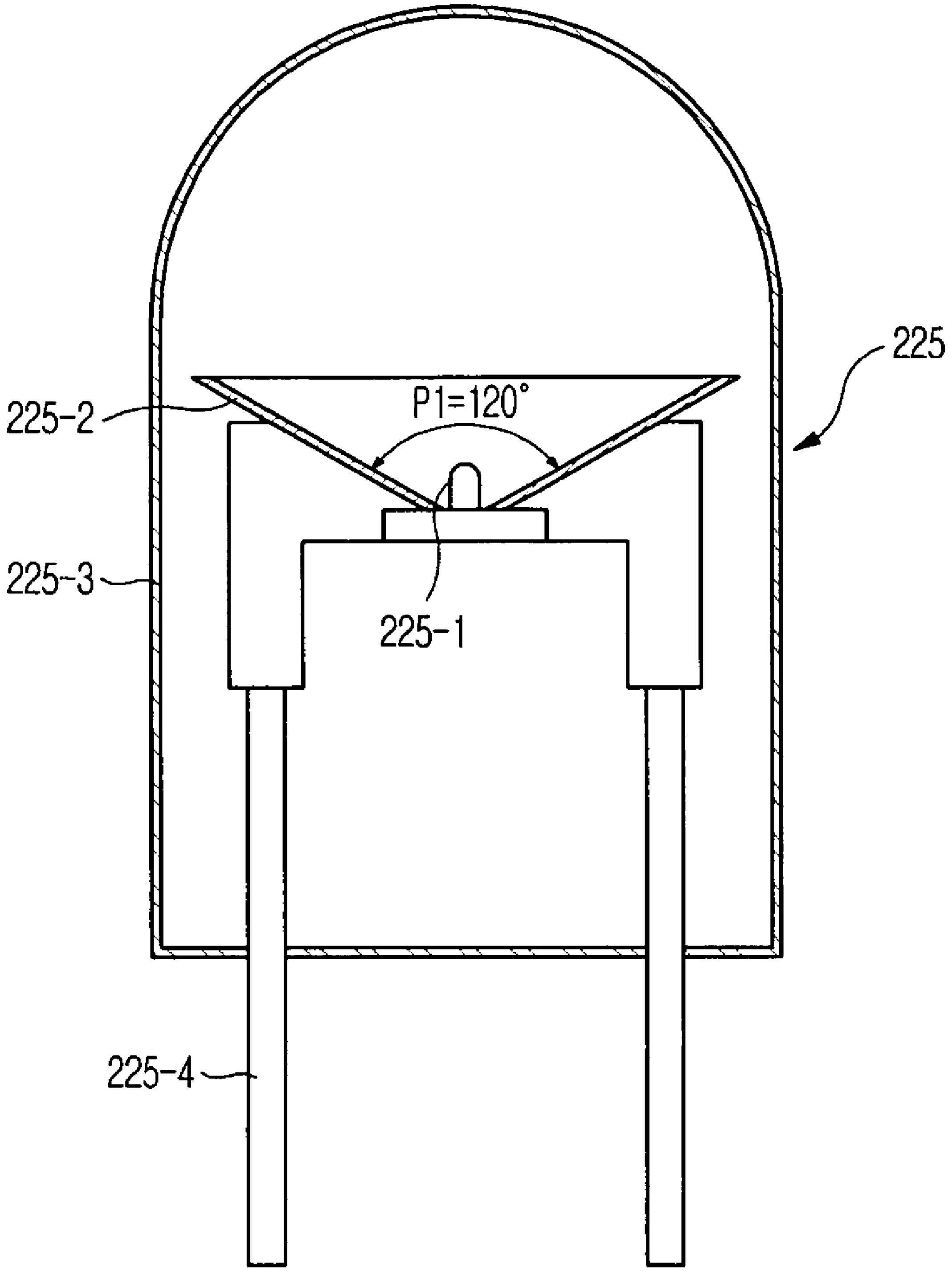
FIG. 4A is a schematic view illustrating the structure of an infrared lamp, having a wide angle of projection, of the bar code scanner according to an embodiment of the present invention.
Figure 4B:
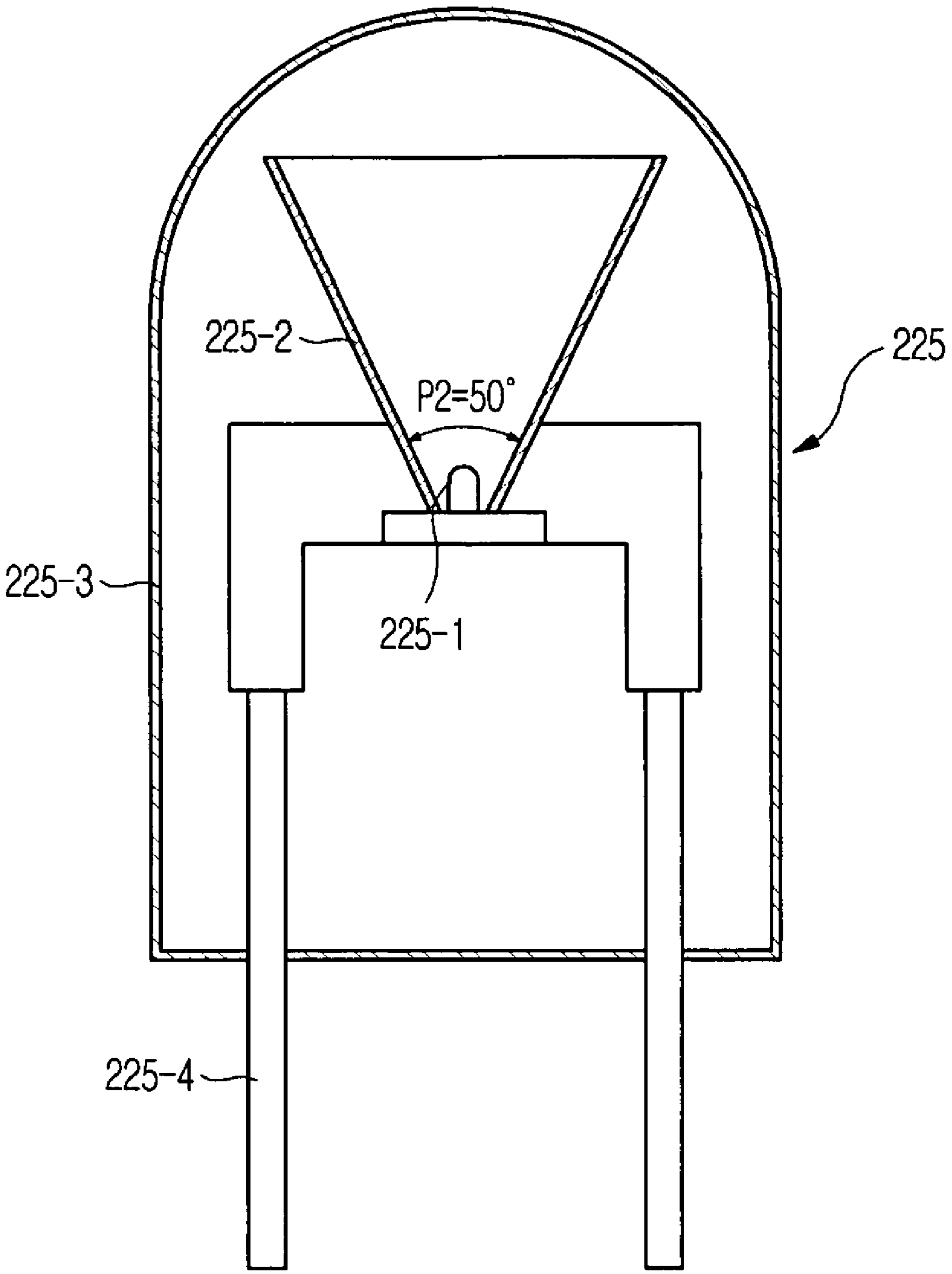
FIG. 4B is a schematic view illustrating the structure of an infrared lamp, having a narrow angle of projection, of the bar code scanner according to an embodiment of the present invention.

As described above, the angles of projection of the infrared lamps 225 are determined by angles of reflection of the infrared lamps 225. FIG. 4A illustrates the infrared lamp 225, the angle of projection (P1) of which is 120°, and FIG. 4B illustrates the infrared lamp 225, the angle of projection (P2) of which is 50°.

Each infrared lamp 225 comprises a light source 225-1, a reflection plate 225-2 to reflect the light of the light source 225-2, a connection pin 225-4 to supply power to the light source 225-1, and a protection lid 225-3 to accommodate the light source 225-1, the reflection plate 225-2 and the connection pin 225-4.

Figure 5:
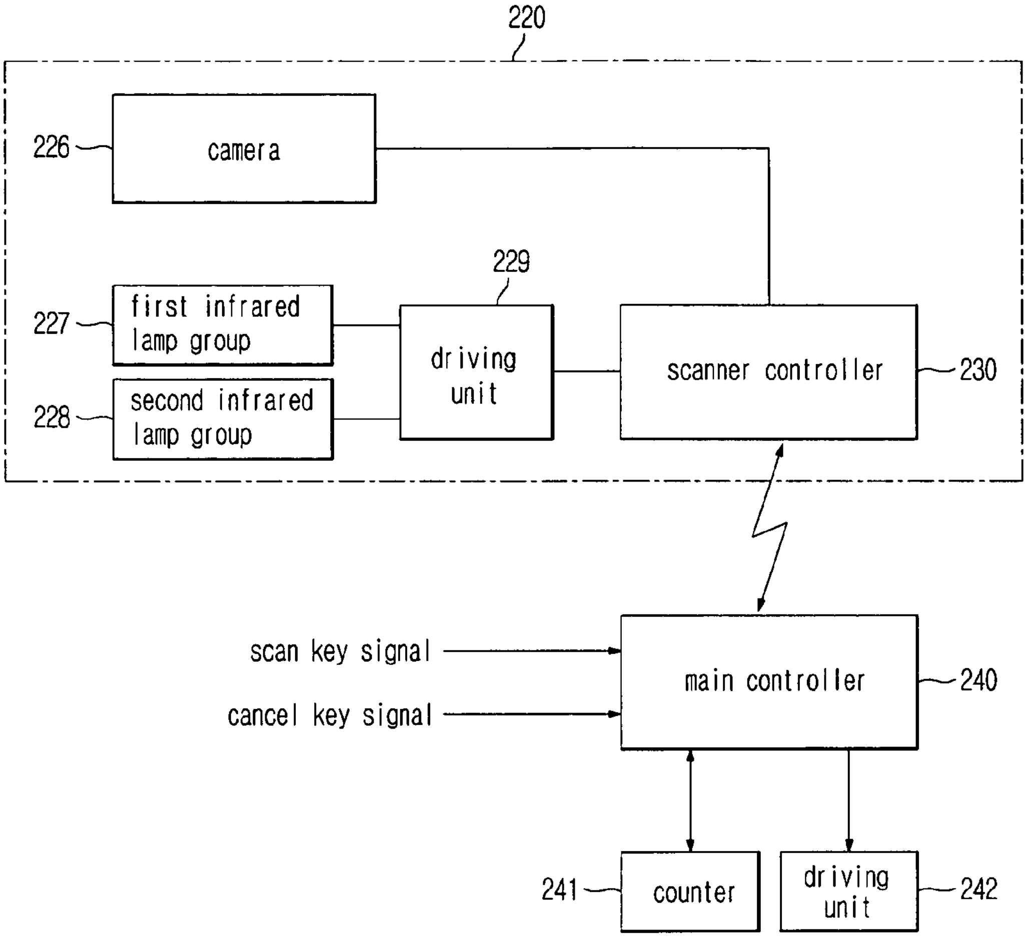
FIG. 5 is a block diagram of an apparatus for controlling a microwave oven in accordance with an embodiment of the present invention.

FIG. 5 is a block diagram of an apparatus for controlling the microwave oven in accordance with an embodiment of the present invention. Here, the infrared lamps 225 having a wide angle of projection and the infrared lamps 225 having a narrow angle of projection are alternately arranged.

The bar code scanner 220 comprises a scanner controller 230 to control a bar code-scanning operation of the bar code scanner 220. The scanner controller 230 controls a driving unit 229 to drive a first lamp group 227 and a second lamp group 228, and to receive the image of a barcode from a camera 226.

The first infrared lamp group 227 comprises infrared lamps L1, L3, . . . , L5 having the first angle of projection (P1), and the second infrared lamp group 228 comprises infrared lamps L2, L4, . . . , L16 having the second angle of projection (P2).

Figure 6:
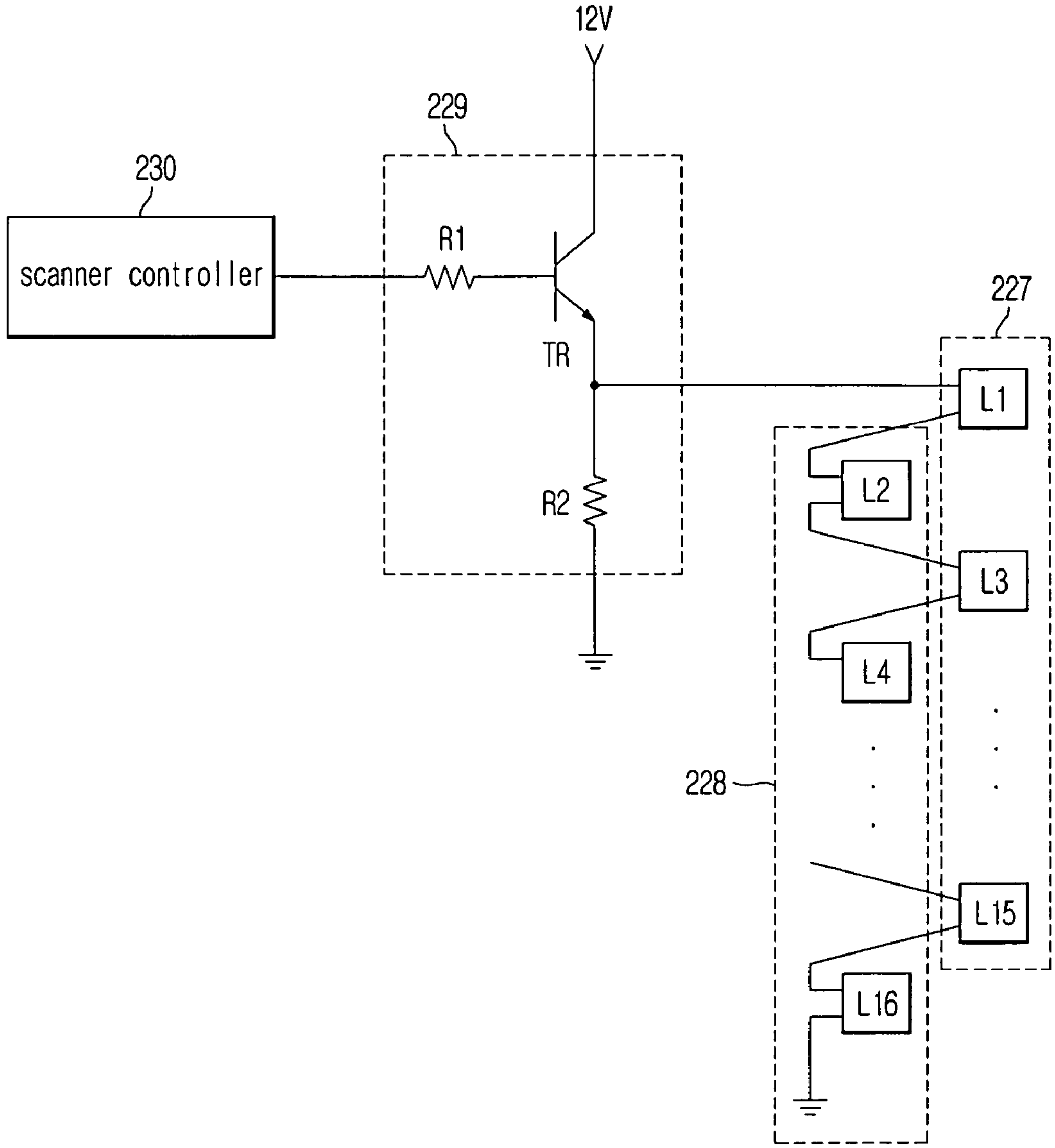
FIG. 6 is a block diagram of a scanner controller for operating infrared lamps having a narrow angle of projection in a first group and infrared lamps having a wide angle of projection in a second group.

In FIG. 6, the first infrared lamp group 227 and the second infrared lamp group 228 are electrically connected in series such that the infrared lamps L1, L3, . . . , L15 of the first infrared lamp group 227 and the infrared lamps L2, L4, . . . , L16 of the second infrared lamp group 228 are alternately arranged.

The scanner controller 230 is interfaced with a main controller 240 controlling the overall operation of the microwave oven. Thus, the scanner controller 230 transmits and receives control instructions regarding the scanning operation, and outputs a scan-ON signal for operating the driving unit 229 and a scan-OFF signal according to the control instructions.

The driving unit 229 of the bar code scanner 220 comprises a transistor TR, which is turned on by the scan-ON signal of the scanner controller 230 and turned off by the scan-OFF signal of the scanner controller 230, and resistors R1 and R2. When the transistor TR is turned on by the scan-ON signal of the scanner controller 230, power of 12V is supplied to the infrared lamps L1, L3, . . . , L15 of the first infrared lamp group 227 and the infrared lamps L2, L4, . . . , L16 of the second infrared lamp group 228, and all of the infrared lamps L1, L2, . . . , L16 are turned on. Thereafter, when the scanner controller 230 outputs the scan-OFF signal to the driving unit 229, the transistor TR is turned off, and thus all of the infrared lamps L1, L2, . . . , L16 are turned off.

When the infrared lamps L1, L3, . . . , L15 of the first infrared lamp group 227 and the infrared lamps L2, L4, . . . , L16 of the second infrared lamp group 228 are turned on, light which is projected on a bar code attached to a package of food, is reflected. Then, the camera 226 supplies the image of the bar code, which is reflected by the package and incident on a lens of the camera 226, to the scanner controller 230.

The scanner controller 230 decodes the image of the bar code, and transmits the decoded data to the main controller 240.

The main controller 240 interprets the decoded data of the image of the bar code, and recognizes data of the bar code based on the interpreted data of the image of the bar code. Then, the main controller 240 controls a driving unit 242 of the microwave oven so that a load (not shown), such as a magnetron or a circulation fan, is operated to appropriately cook the food according to the recognized data of the bar code.

The main controller 240 supplies a scan start signal for scanning the bar code to the scanner controller 230 in response to a scan key signal inputted from the operating panel 200 by a user, and the scanner controller 230 controls the first and second infrared lamp groups 227 and 228 in response to the scan start signal so that the infrared lamps L1, L2, . . . , L16 project light through the window 222 to scan the bar code.

The main controller 240 controls a counter 241 so that the counter 241 measures the time when the scanning operation is stopped. When the measured time elapses a designated time, or when a cancel key signal for canceling the scanning operation is inputted by a user, the main controller 240 supplies a scan end signal to the scanner controller 230, and the scanner controller 230 turns off the infrared lamps L1, L2, . . . , L16 of the first and second infrared lamp groups 227 and 228 in response to the scan end signal.

Hereinafter, the operation of the above-described microwave oven of the present invention and a process for controlling the microwave oven, in which a bar code attached to a package of food is scanned and the food is cooked using the scanned data of the bar code, will be described in detail.

Figure 7:
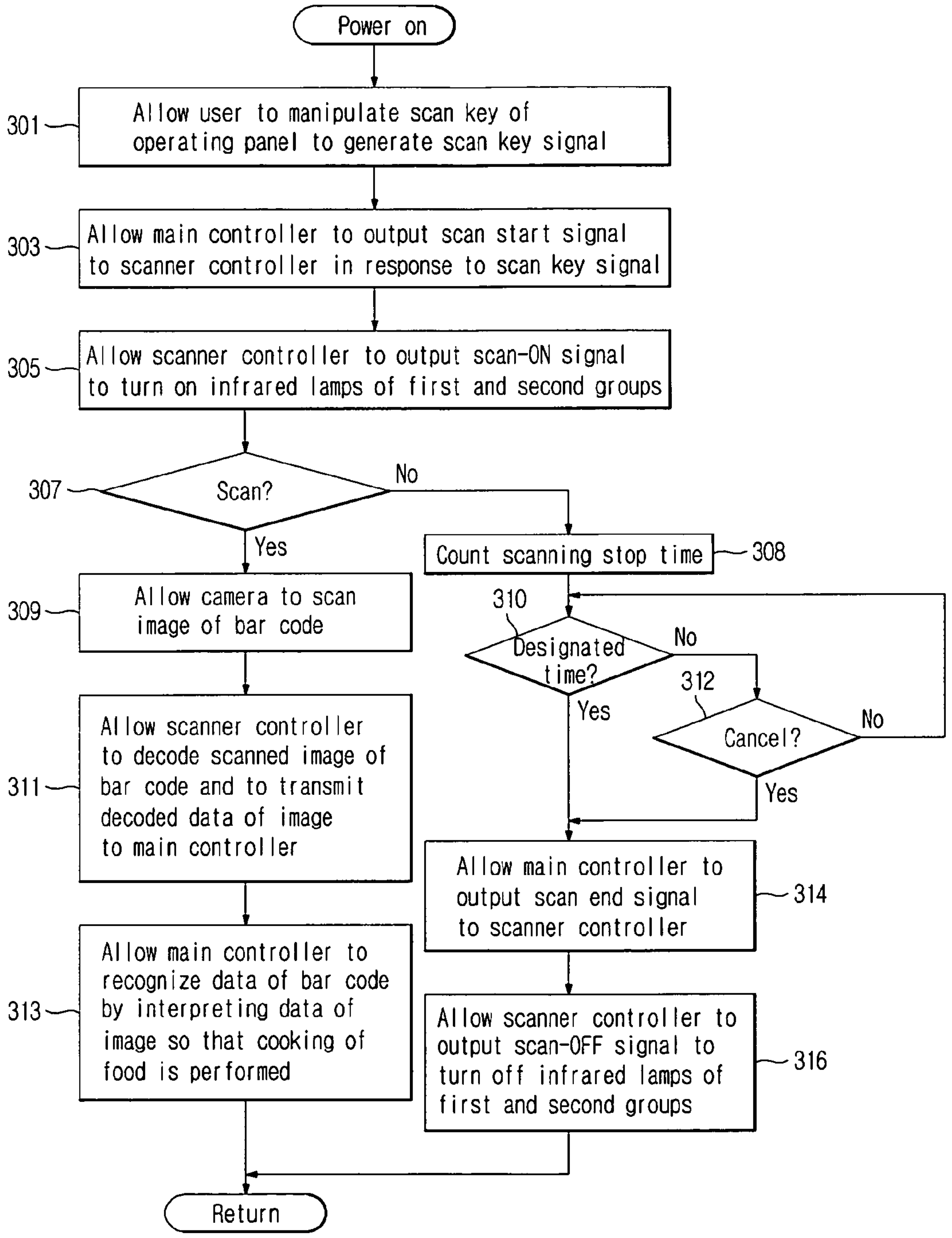
FIG. 7 is a flow chart illustrating a method for controlling a microwave oven in accordance with an embodiment of the present invention.

As shown in FIG. 7, in operation 301, the user manipulates the scan key of the operating panel 200 to generate the scan key signal, and the scan key signal is inputted to the main controller 240. In response to the scan key signal inputted in operation 301, the process moves to operation 303 where the main controller 240 supplies the scan start signal to the scanner controller 230. From operation 303, the process moves to operation 305 where the scanner controller 230 outputs the scan-ON signal so that the infrared lamps L1, L3, . . . , L15 having the wide angle of projection of the first infrared lamp group 227 and the infrared lamps L2, L4, . . . , L16 having the narrow angle of projection of the second infrared lamp group 228 are turned on. The light emitted from the infrared lamps L1, L2, . . . , L16 is projected through the window 222. Here, the range of the bar code scanner 220 for precisely scanning the bar code is a distance from the outer surface of the window 222 to an area separated from the window 222 by a designated distance. That is, when the food is located within the recognition distance (D2), the bar code attached to the package of the food can be scanned by the bar code scanner 220.

From operation 305, the process moves to operation 307, where the main controller 240 determines whether the scanning of the bar code will be carried out. When it is determined that the scanning of the bar code won't be carried out in operation 307, the process moves to operation 308, where the main controller 240 controls the counter 241 so that the counter 241 measures the scanning stop time, and from operation 308, the process moves to operation 310 where it is determined whether the measured time elapses a designated time (for example, 20 seconds). When it is determined that the measured time does not elapse the designated time in operation 310, the process moves to operation 312, where the main controller 240 determines whether the cancel key signal for canceling the scanning operation is inputted. When it is determined that the cancel key signal is inputted in operation 312 or when it is determined that the measured time elapses the designated time in operation 310, the process then moves to operation 314, where the main controller 240 outputs the scan end signal to the scanner controller 230. In response to the scan end signal outputted in operation 314, the process moves to operation 316, where the scanner controller 230 outputs the scan-OFF signal to the driving unit 229. Then, the transistor (TR) of the driving unit 229 is turned off, and the infrared lamps L1, L2, . . . , L16 of the first and second infrared lamp groups 227 and 228 are turned off. Thereby, the scanning operation is stopped.

Alternatively, when it is determined that the scanning of the bar code will be carried out in operation 307, the process moves to operation 309, where the camera 226 scans the image of the bar code, and transmits the scanned image to the scanner controller 230. From operation 309, the process moves to operation 311, where the scanner controller 230 decodes the image of the bar code, and transmits the decoded data of the image of the bar code to the main controller 240. From operation 311, the process moves to operation 313, where the main controller 240 recognizes data of the bar code by comparing the data of the image of the bar code to predetermined data, and performs a cooking operation based on the recognized data of the bar code.

As apparent from the above description, the present invention provides an apparatus and method for controlling a microwave oven using a bar code, in which the bar code is scanned when food having the bar code is close to an operating panel of the microwave oven, so that the cooking of food having the bar code is simply and conveniently performed. Further, the apparatus of the present invention comprises infrared lamps having a wide angle of projection and infrared lamps having a narrow angle of projection, which are alternately arranged, thereby increasing the bar code recognition distance thereof. Moreover, the apparatus of the present invention is easily and economically operated.

Although an embodiment of the invention has been shown and described, it would be appreciated by those skilled in the art that changes may be made in this embodiment without departing from the principles and spirit of the invention, the scope of which is defined in the claims and their equivalents.

What is claimed is:

1. An apparatus for controlling a microwave oven using a bar code comprising:

an operating panel provided on a front surface of the microwave oven;

a bar code scanner installed in the operating panel, and projecting light to the bar code attached to a package of food to obtain data of the bar code; and a main controller to control a cooking operation for cooking the food according to the data of the bar code obtained by the bar code scanner, wherein the bar code scanner comprises at least a first group of lamps comprising at least two lamps and a second group of lamps comprising at least two lamps to scan the bar code, the mounting angles of the lamps of the first and second groups of lamps are identical to each other, the lamps of the first group of lamps have a first angle of projection of light irradiated from the lamps, and the lamps of the second group of lamps have a second angle of projection of light irradiated from the lamps that is smaller than the first angle of projection.

2. The apparatus as set forth in claim 1, wherein the bar code scanner further comprises:

a window, through which the light radiated from the lamps passes; and a substrate, on which the lamps are installed.

3. The apparatus as set forth in claim 2, wherein the bar code scanner further comprises:

a camera to capture an image of the bar code; and a scanner controller for decoding the image of the bar code.

4. The apparatus as set forth in claim 3, wherein the lamps of the first group and the lamps of the second group are connected in series such that the lamps of the first and second group are alternately arranged.

5. The apparatus as set forth in claim 4, wherein the lamps of the first and second groups of lamps are infrared lamps.

6. The apparatus as set forth in claim 4, wherein the first angle of projection is 120°, and the second angle of projection is 50°.

7. The apparatus as set forth in claim 3, wherein the scanner controller performs the scanning of the bar code or stops the scanning of the bar code according to control instructions of the main controller.

8. The apparatus of claim 2, wherein the operating panel further comprises an outer case and an inner case, wherein the window is fixed with the outer case of the operating panel, and the substrate is fixed with the inner case of the operating panel, and is separated from the outer case by a designated distance when the inner case and the outer case are connected together.

9. The apparatus as set forth in claim 1, further comprising a counter to measure the scanning stop time in which the scanning operation for obtaining the data of the bar code is stopped, wherein the main controller stops the scanning operation when the scanning stop time during the scanning operation elapses a designated time.

10. The apparatus of claim 1, wherein each lamp comprises a light source, a reflection plate to reflect light from the light source, a connection pin to supply power to the light source, and a protection lid to accommodate the light source, the reflection plate, and the connection pin.

* * * * *